Figure 1:
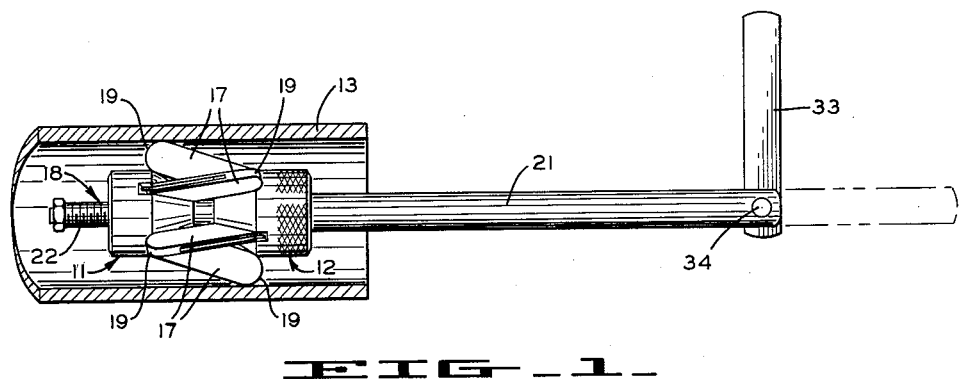

June 9, 1964  J. B. GILL  3,136,560

CENTERING DEVICES

Filed Dec. 27, 1960

INVENTOR.
JOHN B. GILL

BY *Schapp & Hatch*

ATTORNEYS

United States Patent Office 3,136,560
Patented June 9, 1964

3,136,560
CENTERING DEVICES
John B. Gill, 20433 Earl St., Torrance, Calif.
Filed Dec. 27, 1960, Ser. No. 78,607
8 Claims. (Cl. 279—2)

This invention relates to improvements in centering devices and more particularly to pipe arbors of the type illustrated in United States Patent No. 2,607,376 issued August 19, 1952 to John T. Montgomery and entitled Pipe Machining Tool.

The centering means of the present invention is particularly adapted for use in supporting tools used for cutting off and machining the ends of asbestos-cement pipe sections. A tool of this character is shown and described in my co-pending application Serial No. 827,043 for Adjustable Pipe Machining Tool.

The machining tool is mounted for rotation around an arbor shaft which must be mounted as nearly concentric with the pipe as possible. Several problems are encountered in connection with the positioning and locking of the arbor into the desired position. For example, the pipe is sometimes slightly out of round and often has minor irregularities on its inner surface. The present device is adapted to bring the axis of the shaft substantially onto the median center of the pipe, that is, approximately on the axis closest to being the common axis of all irregularities.

Another defect is encountered in installing the arbor, particularly in pipes of relatively small diameter such as 2" pipe. In order to expand the centering fingers the shaft must be rotated relative to the rest of the assembly. Where the pipe is so small as to preclude the operator from putting his hand inside the pipe and holding the assembly against rotation, it has previously been extremely difficult to accomplish the required relative rotation.

The present device is formed in such manner that the fingers may be expanded outwardly to just contact the inner surface of the pipe sufficiently to prevent rotation of the finger assembly in the pipe during the initial stages of the tightening procedure. This initial contact with the pipe may be accomplished at the extreme end of the pipe and the assembly thereafter pushed into the pipe the required distance.

The configuration of the pipe engaging fingers of my device also provides a firm grip on the interior of the pipe throughout the whole range of sizes with which the centering device is intended to be used, provides an improved automatic centering action, and prevents damage to the interior of the pipe.

Accordingly it is a principal object of the present invention to provide a centering device which will afford a precise and automatic centering action and which will hold the assembly firmly in such position.

Another object of the present invention is to provide a self-centering arbor shaft which may be easily and rapidly applied to a wide range of pipe sizes and which is easy to operate in pipes of relatively small inside diameter.

A further object of the present invention is to provide in a self-centering arbor of the character described, a plurality of pipe engaging fingers having a configuration adapted to seat firmly against the inner surface of the pipe without damage to such surface even where the pipe may be made of bituminous or other relatively soft material.

Another object of the invention is to provide a device of the character described which is adapted for obtaining a center in any type of open-ended cylinder and which provides such a firm grip against the cylinder walls that it may be used as a pulling tool.

Yet another object of the present invention is to provide an arbor of the character described which is especially adapted for supporting tools used in cutting off and machining the ends of asbestos-cement pipe sections.

Further objects and advantages of my invention will appear as the specification proceeds and the novel features of my invention will be fully defined in the claims attached hereto.

Figure 2:
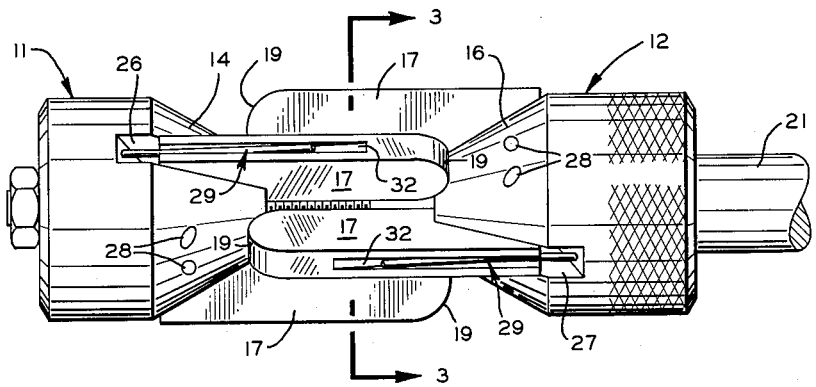
Figures 3, 4:
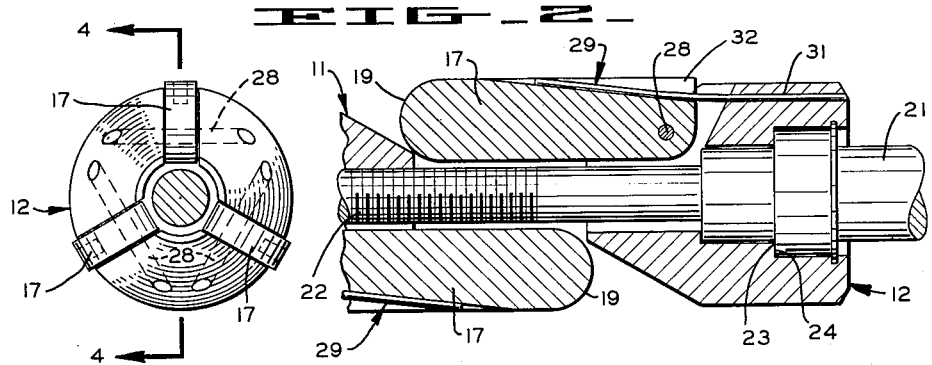

The preferred form of my invention is illustrated in the accompanying drawing in which:

FIGURE 1 is a side elevational view of a centering device constructed in accordance with the present invention and shown mounted in operative position in the end of a cylindrical pipe;

FIGURE 2, an enlarged side elevational view of the finger assembly end of the pipe centering device of FIGURE 1 and illustrates the members in an inoperative position;

FIGURE 3, a vertical cross-sectional view taken substantially on the plane of line 3—3 of FIGURE 2;

FIGURE 4, a longitudinal cross-sectional view taken substantially on the plane of line 4—4 of FIGURE 3.

While I have shown only the preferred form of my invention, I wish to have it understood that various changes and modifications may be made within the scope of the claims attached hereto without departing from the spirit of the invention.

Referring to the drawing in detail, my tool comprises in its principal features a pair of members 11 and 12 positionable in a cylinder such as pipe 13 and having confronting conical faces 14 and 16, a plurality of elongated fingers 17 pivoted at one end at spaced points around the periphery of each of the members 11 and 12, and means 18 for urging the members 11 and 12 toward each other so that the distal ends 19 of the fingers 17 will be displaced evenly outwardly for contact with the inner surface of the pipe 13 so as to concentrically position the members 11 and 12 therein.

The means 18 preferably includes a shaft 21 upon which the members 11 and 12 are carried and which is held in coaxial relation to the pipe when the fingers 17 are engaged with the latter. The outer end 22 of the shaft 21 is threadably engaged with the member 11 and the member 12 is held against axial movement on the shaft. Thus, when shaft 21 is rotated relative to member 11, the latter will move toward and away from the member 12.

The member 12 is journaled for rotation on shaft 21 but is held against axial movement away from member 11 by confronting shoulders 23 and 24 formed on the shaft 21 and member 12 respectively.

In accordance with the present invention the fingers 17 are urged outwardly by a camming action against the confronting conical faces 14 and 16. This causes the fingers to move outwardly at the same rate and provides the automatic centering action because the outer ends of all the fingers are always the same distance from the axis of the assembly. No scissors action or other linkage is required.

Preferably, at least three fingers are mounted on each member 11 and 12 so that their ends will engage the pipe at three points spaced equally around the inner periphery thereof. Of course it will be understood that more than three fingers could be used on each member. Also it is preferred to mount the fingers so that the fingers projecting from member 11 lie half way between the fingers projecting from member 12.

As here shown, each of the members 11 and 12 is provided with three fingers 17 of flat, elongated form. The fingers are held against canting or twisting in grooves 26 and 27 machined into the members 11 and 12. The pivotal attachment of the fingers to the members is provided by pins 28 mounted through the members 11 and 12 in the manner best seen in FIGURE 3 of the drawing.

As a feature of the invention, spring means 29 is provided for returning the fingers to the inoperative position of FIGURE 2 when the members 11 and 12 are moved apart. As here shown, the means 29 comprises pieces of spring wire mounted in bores 31 formed in the members 11 and 12 and projecting therefrom through grooves 32 formed in the outer edges of the fingers. The spring means is important in that the arbor could not be removed easily from the pipe if the fingers were allowed to remain in their outwardly spread position.

In accordance with the present invention and as an important feature thereof, the outer ends 19 of the fingers 17 are rounded in the manner shown in the drawing. This provides several advantages. In the first place, the same shape is presented to the interior of the pipe, whatever the size of pipe. Secondly, the rounded ends will not dig into the interior surface of the pipe even if the latter is made of soft material such as bituminized wood fiber pipe. Rather, the finger ends will seat firmly against even the relatively soft surfaces and thus will hold the arbor more securely than would fingers having points or other configurations at their ends.

Thirdly, the fingers may be expanded outwardly until they contact the inner surface of the pipe sufficiently to hold the finger assembly against rotation therein, and the rounded ends permit the assembly to then be shoved as deeply into the pipe end as may be required. This is particularly important where small sizes of pipe are being used and there is not sufficient room for the operator to reach into the pipe and hold the finger assembly from rotating during the initial rotation of shaft 21.

In order to provide sufficient leverage for firmly locking the finger assembly into place, the end of shaft 21 is preferably provided with a handle 33. This handle is formed of flat bar stock and has a width not greater than the diameter of shaft 21. One end of the handle is pivoted on pin 34 to the end of shaft 21 for movement between the position shown in phantom lines in FIGURE 1 of the drawing and the position shown in solid lines wherein the handle extends perpendicularly to the shaft.

With the handle in the position shown in solid lines in FIGURE 1, twisting force may be exerted on shaft 21 sufficient to lock the arbor firmly in place. When the handle is moved to the position illustrated in phantom lines, the tool or other device to be used on the shaft may be slid onto the shaft over the handle 33.

Because of the automatic centering action of my device, it may be used successfully for finding the center of any open-ended cylinder. The arbor also has a useful purpose as a centering shaft for mounting reaming tools on engine and hydraulic cylinders. Due to the firm grip exerted against the inside surface of the cylinder as a result of the novel camming action, the tool can also be used as an expanding device for pulling tubing or cylinder liners.

From the foregoing it will be apparent that I have provided a novel and useful improvement in centering devices which will provide more precise centering and firmer grip than has heretofore been available, which is easier and simpler to use, and which contains provisions for operating the device in confined areas and under adverse conditions, which will not damage the pipe or other cylinder in which it is inserted, and which is sturdy and inexpensive to manufacture.

I claim:

1. A centering device, comprising a pair of members positionable in a cylinder and having confronting conical faces, a plurality of elongated fingers pivotally attached at one end to said members at spaced points around the periphery of each of said members and extending into contact with the conical face of the other of said members, and means for urging said members toward each other whereby the distal ends of said fingers will be displaced evenly outwardly for contact with the surface of the cylinder so as to concentrically position the members therein.

2. A centering device, comprising a pair of members positionable in a cylinder and having confronting conical faces, a plurality of elongated fingers pivotally attached at one end to said members at spaced points around the periphery of each of said members and extending into contact with the conical face of the other of said members, means for urging said members toward each other whereby the distal ends of said fingers will be displaced evenly outwardly for contact with the surface of the cylinder so as to concentrically position the members therein, and spring means mounted between said fingers and said members and biased to urge the distal ends of the fingers inwardly for moving the fingers out of contact with the cylinder when withdrawing the members therefrom.

3. A centering device, comprising a pair of members positionable in a cylinder and having confronting conical faces, a plurality of elongated fingers pivotally attached at one end to said members at spaced points around the periphery of each of said members and extending into contact with the conical face of the other of said members, the distal ends of said fingers being of rounded form whereby the finger ends may be moved into sliding contact with the inner surface of said cylinder and the members then moved axially into the cylinder, and means for urging the said members toward each other when in said cylinder so as to displace the distal ends of said fingers outwardly into gripping contact with the surface of the cylinder.

4. An arbor, comprising an elongated shaft, a pair of members mounted on said shaft for positioning in a cylinder, said members being formed with confronting conical faces, a plurality of elongated fingers pivotally attached at one end to said members at spaced points around the periphery of each of said members and extending into contact with the conical face of the other of said members, and means for urging said members toward each other whereby the distal ends of said fingers will be displaced evenly outwardly for contact with the surface of the cylinder so as to concentrically position the members therein.

5. An arbor, comprising an elongated shaft, a pair of members mounted on said shaft for positioning in a cylinder, said members being formed with confronting conical faces, a plurality of elongated fingers pivotally attached at one end to said members at spaced points around the periphery of each of said members and extending into contact with the conical face of the other of said members, means for urging said members toward each other whereby the distal ends of said fingers will be displaced evenly outwardly for contact with the surface of the cylinder so as to concentrically position the shaft therein, a threaded connection formed between said shaft and one of said members, and abutting shoulders on the other member and the shaft formed to prevent movement of said last named member away from the first named member whereby rotation of the shaft relative to the members will move the latter together for displacing the distal ends of the fingers outwardly.

6. An arbor, comprising an elongated shaft having an end adapted for insertion into a pipe, a first member threadably attached to said end, a second member journaled for rotation on said shaft and held against endwise movement thereon away from said first member, said first and second members being formed with confronting conical faces, a first set of elongated fingers pivotally attached at one end to said first member at spaced points around the periphery of said first member and extending into sliding contact with the conical face of said second member, and a second set of elongated fingers pivotally attached at one end to said second member at spaced points around the periphery of said second member and extending into sliding contact with the conical face of said first named member between said first named fingers, said fingers and said conical faces being proportioned to urge the distal ends of said fingers outwardly and into firm engagement with the interior of the pipe so as to hold said shaft securely in concentric relation to the pipe.

7. An arbor, comprising an elongated shaft having an end adapted for insertion into a pipe, a first member threadably attached to said end, a second member journaled for rotation on said shaft and held against endwise movement thereon away from said first member, said first and second members being formed with confronting conical faces, a first set of elongated fingers pivotally attached at one end to said first member at spaced points around the periphery of said first member and extending into sliding contact with the conical face of said second member, and a second set of elongated fingers pivotally attached at one end to said second member at spaced points around the periphery of said second member and extending into sliding contact with the conical face of said first named member between said first named fingers, said fingers and said conical faces being proportioned to urge the distal ends of said fingers outwardly and into firm engagement with the interior of the pipe so as to hold said shaft securely in concentric relation to the pipe, the end of said shaft opposite to said members being formed with a handle pivoted thereto for movement between a position aligned with said shaft and a position at right angles to the shaft for rotating the latter so as to move the ends of said fingers into and out of engagement with the inside surface of said pipe.

8. An arbor as defined in claim 7 and wherein the distal ends of said fingers are of rounded form, and spring means formed for urging said fingers against the confronting conical faces.

References Cited in the file of this patent
UNITED STATES PATENTS

| | | |
|---|---|---|
| 1,368 | Burr | Oct. 12, 1839 |
| 39,694 | Werum | Aug. 25, 1863 |
| 292,167 | Lytle | Jan. 22, 1884 |
| 967,175 | Demarchi | Aug. 16, 1910 |
| 1,160,625 | Long | Nov. 16, 1915 |
| 1,670,886 | Fellows | May 22, 1928 |
| 1,682,309 | Schoenfeld | Aug. 28, 1928 |
| 1,710,902 | Stachowski | Apr. 30, 1929 |
| 2,607,376 | Montgomery | Aug. 19, 1952 |
| 2,787,098 | Rosenhagen | Apr. 2, 1957 |

FOREIGN PATENTS

| | | |
|---|---|---|
| 11,148 | Germany | Oct. 28, 1880 |
| M21,586 | Germany 1B/49a | May 24, 1956 |